(12) United States Patent
Wolfe et al.

(10) Patent No.: US 7,860,934 B1
(45) Date of Patent: Dec. 28, 2010

(54) METHOD AND APPARATUS FOR TRACKING FINANCIAL TRANSACTIONS FOR A USER

(75) Inventors: Jeffrey M. Wolfe, Parrish, FL (US); James A. Slattery, Plano, TX (US)

(73) Assignee: Intuit Inc., Mountain View, CA (US)

( * ) Notice: Subject to any disclaimer, the term of this patent is extended or adjusted under 35 U.S.C. 154(b) by 472 days.

(21) Appl. No.: 11/700,705

(22) Filed: Jan. 30, 2007

(51) Int. Cl.
*G06F 15/16* (2006.01)
(52) U.S. Cl. ............... 709/206; 709/224; 709/245; 705/40
(58) Field of Classification Search ............... 709/206, 709/223, 224, 245; 705/35, 39, 40, 25
See application file for complete search history.

(56) References Cited

U.S. PATENT DOCUMENTS

| | | | | |
|---|---|---|---|---|
| 5,880,731 A * | 3/1999 | Liles et al. | ............... | 715/758 |
| 5,920,848 A * | 7/1999 | Schutzer et al. | ........... | 705/42 |
| 7,536,349 B1 * | 5/2009 | Mik et al. | .................. | 705/39 |
| 2002/0140732 A1* | 10/2002 | Tveskov | .................. | 345/763 |
| 2003/0156134 A1* | 8/2003 | Kim | .......................... | 345/753 |
| 2003/0208545 A1* | 11/2003 | Eaton et al. | ............... | 709/206 |
| 2004/0015702 A1* | 1/2004 | Mercredi et al. | ........... | 713/182 |
| 2004/0088232 A1* | 5/2004 | Minnis, Jr. | .................. | 705/30 |
| 2004/0209596 A1* | 10/2004 | Wong et al. | ................. | 455/405 |
| 2005/0013300 A1* | 1/2005 | Akahane et al. | ........... | 370/395.3 |
| 2005/0055435 A1* | 3/2005 | Gbadegesin et al. | ........ | 709/224 |
| 2005/0096990 A1* | 5/2005 | Algiene et al. | ............... | 705/21 |
| 2005/0144131 A1* | 6/2005 | Aziz | .......................... | 705/42 |
| 2005/0192889 A1* | 9/2005 | Sauter et al. | .................. | 705/37 |
| 2005/0192893 A1* | 9/2005 | Keeling et al. | ............... | 705/39 |
| 2006/0153068 A1* | 7/2006 | Dally et al. | .................. | 370/219 |
| 2006/0233106 A1* | 10/2006 | Achlioptas et al. | .......... | 370/235 |
| 2006/0265279 A1* | 11/2006 | Livingston et al. | ............ | 705/14 |
| 2007/0022015 A1* | 1/2007 | Tarinelli et al. | ............... | 705/26 |
| 2007/0027802 A1* | 2/2007 | VanDeburg et al. | ........... | 705/39 |
| 2007/0055597 A1* | 3/2007 | Patel et al. | ..................... | 705/35 |
| 2007/0130619 A1* | 6/2007 | Reams, III | ................... | 726/13 |
| 2007/0244830 A1* | 10/2007 | Hilderman | .................... | 705/67 |

\* cited by examiner

*Primary Examiner*—Oanh Duong
(74) *Attorney, Agent, or Firm*—Park, Vaughan, Fleming & Dowler LLP (57) ABSTRACT

A system that tracks financial transactions for a user is presented. During operation, the system receives an electronic message which includes one or more parameters for a financial transaction. The system parses the electronic message to extract the one or more parameters for the financial transaction. The system determines a source address for the electronic message. Next, the system determines whether the source address is associated with a user account. If so, the system associates the one or more parameters for the financial transaction with the user account.

53 Claims, 4 Drawing Sheets

---

FINANCIAL TRANSACTION TRACKING APPLICATION 105

- RECEIVING MECHANISM 200
- PARSING MECHANISM 201
- ADDRESS-DETERMINING MECHANISM 202
- ACCOUNT-LOOKUP MECHANISM 203
- ASSOCIATION MECHANISM 204

METHOD AND APPARATUS FOR TRACKING FINANCIAL TRANSACTIONS FOR A USER

BACKGROUND

Related Art

The present invention relates to techniques for tracking financial transactions.

People enter into a variety of financial transactions on a daily basis. For example, these financial transactions can involve: purchasing meals, making charitable contributions, and incurring business expenses. Over time, these financial transactions accumulate and become difficult to track. One solution to this problem is to use a financial application. Unfortunately, if users do not record these transactions soon after those transactions take place, they may forget to enter them at a later time.

This is especially true for cash transactions such as charitable contributions. In the case of charitable contributions, people often make cash donations to charitable causes such as: schools, medical research, and UNICEF. These charitable organizations often do not provide receipts, and even if they do, these receipts can be lost before it is time to prepare a tax return. As a result, people tend to lose track of these charitable contributions. Hence, these charitable contributions are generally underreported and people do not get the benefit of the corresponding tax deductions.

SUMMARY

One embodiment of the present invention provides a system that tracks financial transactions for a user. During operation, the system receives an electronic message which includes parameters for a financial transaction. Next, the system parses the electronic message to extract one or more parameters for the financial transaction. The system then determines a source address for the electronic message. Next, the system determines whether the source address is associated with a user account. If so, the system associates the one or more parameters for the financial transaction with the user account.

In one embodiment, the system determines a destination address for the electronic message. Next, the system determines a financial transaction category associated with the destination address. The system then associates the financial transaction category along with one or more parameters for the financial transaction with the user account.

In one embodiment, the financial transaction category includes one or more selected from the group consisting of: donations; expenses; income; gifts; taxes; and any other financial transaction category the user or system desires to track.

In one embodiment, the system determines a destination address for the electronic message. Next, the system associates the destination address along with the one or more parameters for the financial transaction with the user account. The system then associates a financial transaction category with the destination address.

In one embodiment, if the source address is not associated with a user account, the system creates an unregistered user account that is associated with the source address. The system then associates the one or more parameters for the financial transaction with the unregistered user account.

In one embodiment, after creating the unregistered user account, the system sends the user an electronic message which includes a uniform resource locator (URL) and login information which can be used to access the unregistered account.

In one embodiment, the system allows a user to register the unregistered user account.

In one embodiment, the electronic message is sent by the user.

In one embodiment, the source address is located in a "From" field of the electronic message.

In one embodiment, the electronic message is sent by another entity on behalf of the user.

In one embodiment, the other entity can include a party to the financial transaction.

In one embodiment, the source address is located in a "CC" field of the electronic message.

In one embodiment, the source address is located in one or more of: headers of the electronic message; specified fields of network protocols; and the body of the message.

In one embodiment, the source address includes one or more selected from the group consisting of: an email address; an Internet Protocol (IP) address; a user name; a Tax Identification Number (TIN); a Social Security Number (SSN); an International Mobile Equipment Identity (IMEI) number; a Mobile Equipment Identifier (MEID); an Electronic Serial Number (ESN); a Pseudo ESN (pESN); a Media Access Control (MAC) address; and any other address identification suitable for identifying a source.

In one embodiment, the one or more parameters include, but are not limited to, information about: a party to the financial transaction; an amount of the financial transaction; and a description of the financial transaction.

In one embodiment, while parsing the electronic message to extract the one or more parameters for the financial transaction, the system determines a party to the financial transaction. Next, the system determines the amount of the financial transaction. The system then determines the description of the financial transaction.

In one embodiment, the system performs a set of diagnostics against the user account to determine whether a specified condition in the user account is present. If so, the system notifies the user that the specified condition is present.

In one embodiment, the set of diagnostics can use one or more rulesets.

In one embodiment, one or more financial transaction categories are associated with corresponding rulesets.

In one embodiment, the specified condition can involve exceeding a specified limit for a given financial category.

In one embodiment, the specified condition can involve not meeting a specified minimum threshold for a given financial category In one embodiment, in order to notify the user, the system sends a notification by one or more of: an email message; a short message service (SMS) message; an instant message; an automated phone message; and a message contained in a letter.

In one embodiment, prior to receiving the electronic message, the system creates the user account.

In one embodiment, the system associates one or more source addresses for one or more users authorized to access the user account.

In one embodiment, the system generates a report of financial transactions associated with in the user account.

In one embodiment, the system imports the report into a financial application.

In one embodiment, the system delegates access to the user account to another entity.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Tracking Financial Transactions

Figure 1:
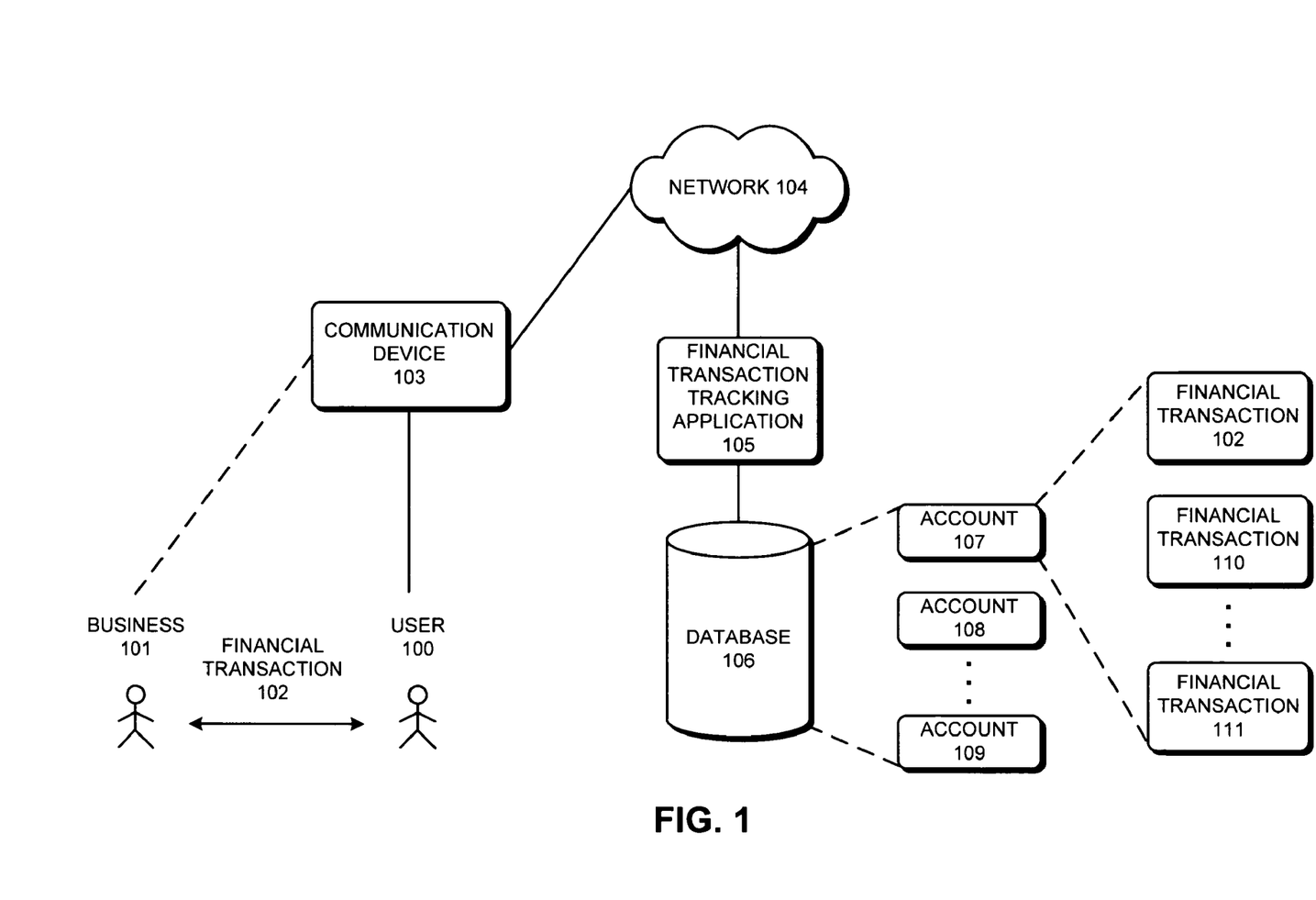
FIG. 1 presents a system diagram which includes a financial transaction tracking application in accordance with an embodiment of the present invention.

FIG. 1 presents a system diagram which includes a financial transaction 102 and a financial-transaction-tracking application 105 in accordance with an embodiment of the present invention. As illustrated in FIG. 1, user 100 consummates financial transaction 102 with business 101. In one embodiment of the present invention, the financial transaction can include but is not limited to: a credit card, cash, a check, a money order, or any other financial instrument.

In one embodiment of the present invention, user 100 generates an electronic message using communication device 103, wherein the electronic message is used to track financial transaction 102. In one embodiment, financial-transaction-tracking application 105 uses the source address for the electronic message to locate an account for the user. For example, the source address may be located in a "From" field of the electronic message. Alternatively, the source address can be located in another field of the electronic message, such as the "CC" field, the "To" field, the "Subject" field or any other header field (e.g., header fields listed at the Internet Assigned Number Authority). Furthermore, the source address can be located in specified fields of network protocols (e.g., the Internet Protocol) and the body of the message (e.g., either encoded or unencoded).

In one embodiment of the present invention, the source address can include: an email address; an Internet Protocol (IP) address; a user name; a Tax Identification Number (TIN); a Social Security Number (SSN); an International Mobile Equipment Identity (IMEI) number; a Mobile Equipment Identifier (MEID); an Electronic Serial Number (ESN); a Pseudo ESN (pESN); a Media Access Control (MAC) address; a domain name and any other unique identifier. Note that if the source address is a domain name, all financial transactions for the domain name are associated with an account for the domain name. For example, if a business owns a domain name somedomain.com, electronic messages sent by employee1@somedomain.com, employee2@somedomain.com, etc. are associated with the account for the domain somedomain.com.

In another embodiment of the present invention, business 101 uses communication device 103 to generate the electronic message on behalf of user 100. In this embodiment, the source address can be located in one or more of: a header field (e.g., header fields listed at the Internet Assigned Number Authority), specified fields of network protocols (e.g., the Internet Protocol), and the body of the message (e.g., either encoded or unencoded). For example, the source address for user 100 can be located in the "CC" field and the source address for business 101 can be located in the "From" field. Using this message configuration, the electronic message can be used to generate a transaction record for financial transaction 102 for both user 100 and business 101.

The electronic message is formatted so that the information contained in the electronic message can be parsed by financial-transaction-tracking application 105. In one embodiment of the present invention, the electronic message is formatted as follows:

<who> <how much> <description>

For example, if the transaction involves a business 101, the transaction amount is $10 and the transaction involves a payment for lawn mowing services, the electronic message can be formatted as follows:

business 101 $10 lawn mowing services

Note that in the above-described format, the how much field can be used to separate the who and the description fields. In other words, financial-transaction-tracking application 105 uses a string of numbers as a delimiter when parsing the electronic message.

In one embodiment, the electronic message includes an identifier which indicates the format of the electronic message. In this embodiment, financial-transaction-tracking application 105 uses the identifier to retrieve the parsing rules for the indicated format. Financial-transaction-tracking application 105 then parses the transaction information using the parsing rules.

In one embodiment of the present invention, the electronic message is formatted using Extensible Markup Language (XML). Note that the data formats described above are not meant to limit the scope of the present invention, and that other data formats, now known or later developed, can be used to format the electronic message.

In one embodiment of the present invention, multiple transactions can be included within a single electronic message.

For example, each transaction can be formatted using on of the exemplary formats described above, wherein each formatted transaction is separated by a specified delimiter (e.g., a new line, a comma a semicolon, etc.).

Communication device 103 then transmits the electronic message through network 104 to financial-transaction-tracking application 105. Note that network 104 can generally include any type of wired or wireless communication channel capable of coupling together computing nodes. This includes, but is not limited to, a local area network, a wide area network, or a combination of networks. In one embodiment of the present invention, network 104 includes the Internet.

Financial-transaction-tracking application 105 parses the electronic message and stores the parameters for the financial transaction 102 in database 106. Note that database 106 can include any type of system for storing data. This includes, but is not limited to, systems based upon magnetic, optical, and magneto-optical storage devices, as well as storage devices based on flash memory and/or battery-backed up memory as well as any other appropriate storage media or using any other appropriate storage mechanism. In one embodiment, database 106 is a distributed database.

In one embodiment of the present invention, the parameters for a financial transaction involving a user are associated with an account for the user. As illustrated in FIG. 1, database 106 includes user accounts 107-109. In this example, user account 107 can be associated with user 100. Hence, the parameters for financial transaction 102 are recorded to user account 107. Note that each user account can include a number of financial transactions. For example, in FIG. 1, user account 107 includes financial transactions 102, and 110-111.

Figure 2:
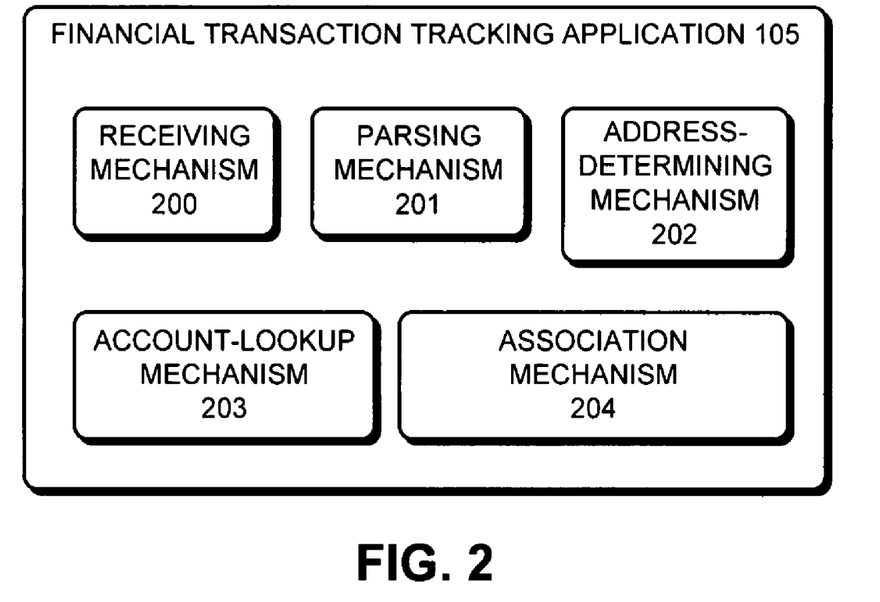
FIG. 2 presents a block diagram illustrating the components of a financial transaction tracking application in accordance with an embodiment of the present invention.

FIG. 2 presents a block diagram illustrating the components of financial-transaction-tracking application 105 in accordance with an embodiment of the present invention. Financial-transaction-tracking application 105 includes receiving mechanism 200, parsing mechanism 201, address-determining mechanism 202, account-lookup mechanism 203, and association mechanism 204. Receiving mechanism 200 is configured to receive an electronic message which includes one or more parameters for a financial transaction. Parsing mechanism 201 is configured to parse the electronic message to extract the one or more parameters for the financial transaction. Address-determining mechanism 202 is configured to determine a source address for the electronic message. Account-lookup mechanism 203 is configured to determine whether the source address is associated with a user account. If the source address is associated with a user account, association mechanism 204 is configured to associate the parameters for the financial transaction with the user account.

Figure 3:
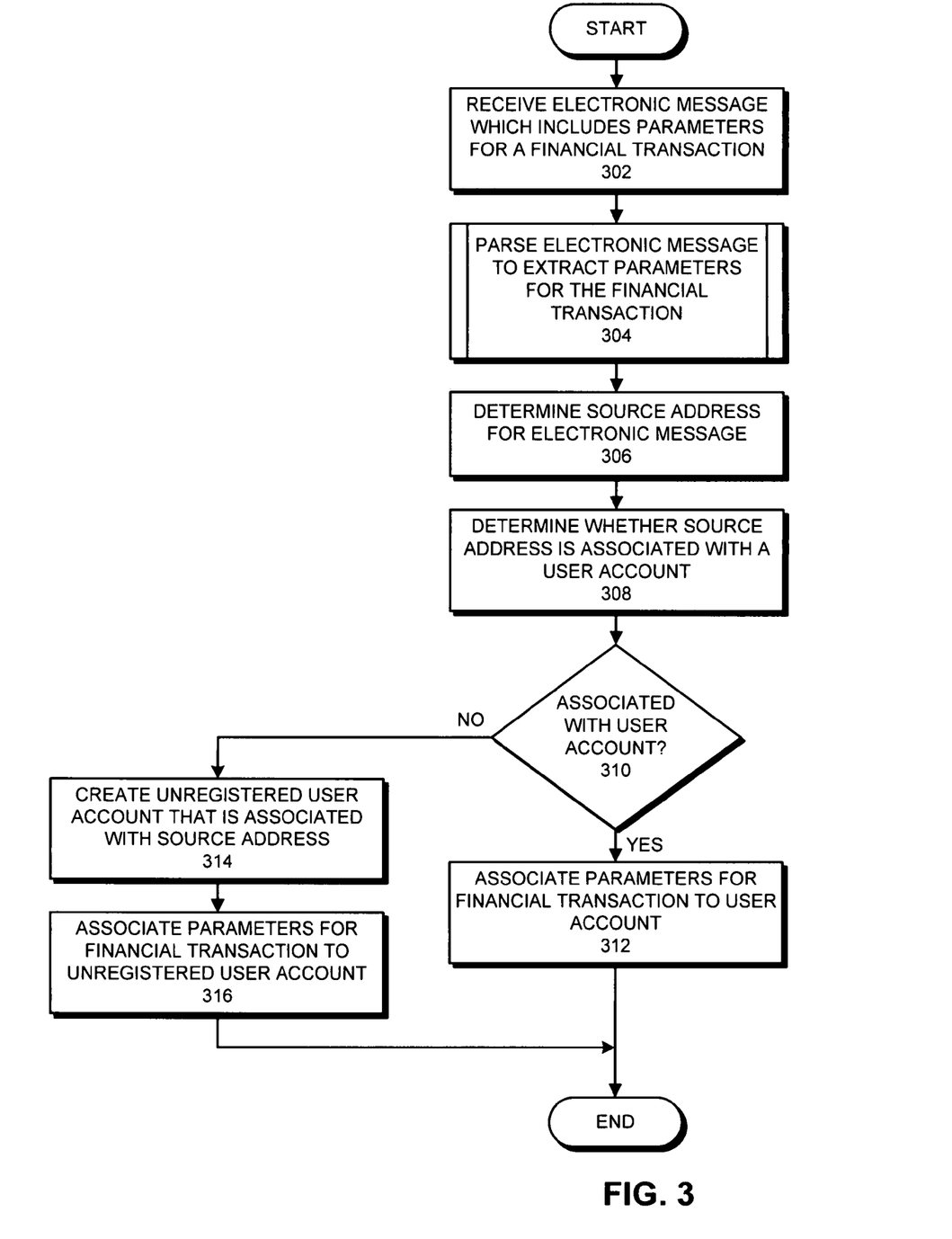
FIG. 3 presents a flow chart illustrating the process of tracking financial transactions for a user in accordance with an embodiment of the present invention.

FIG. 3 presents a flow chart summarizing the process of tracking financial transactions for a user in accordance with an embodiment of the present invention. The process begins when the system receives an electronic message which includes parameters for a financial transaction (step 302). Next, the system parses the electronic message to extract the parameters for the financial transaction (step 304). Note that step 304 is described in more detail with reference to FIG. 6 below. The system then determines a source address for the electronic message (step 306). Next, the system determines whether the source address is associated with a user account (step 308). If so (step 310, yes), the system associates the parameters for the financial transaction with the user account (step 312).

Otherwise (step 310, no), the system creates an unregistered user account that is associated with the source address (step 314). The system then associates parameters for the financial transaction with the unregistered user account (step 316). In one embodiment of the present invention, after creating the unregistered user account, the system sends a user an electronic message which includes a uniform resource locator (URL) and login information which can be used to access the unregistered account. In one embodiment of the present invention, after information is associated with the unregistered user account, the system allows a user to register the unregistered user account. For example, a user can register an unregistered account by going to a website which is associated with financial-transaction-tracking application 105. The user can then create a registered account and associate one or more source addresses with the registered account. The transactions associated with the unregistered account are then associated with the registered account.

User Accounts

In one embodiment of the present invention, prior to using communication device 103 to transmit the electronic message to financial-transaction-tracking application 105, user 100 first creates a user account. In doing so, the user associates one or more source addresses for user 100 with the user account 107.

In another embodiment of the present invention, user 100 first uses communication device 103 to transmit the electronic message to financial-transaction-tracking application 105 prior to creating a user account. In this embodiment, financial-transaction-tracking application 105 stores the parameters for financial transaction 102 in an unregistered user account. Note that an unregistered account can include: an account that was not created by a user and account that has not been confirmed.

Financial Transaction Categories

Figure 4:
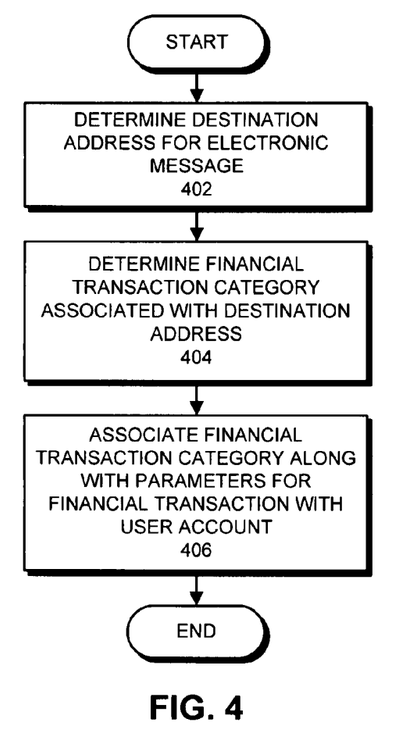
FIG. 4 presents a flow chart illustrating the process of associating a financial transaction category with a financial transaction in accordance with an embodiment of the present invention.

FIG. 4 presents a flow chart illustrating the process of associating a financial transaction category with a financial transaction in accordance with an embodiment of the present invention. The process begins when the system determines a destination address for the electronic message (step 402). For example, the system can determine the destination address by examining the "To" field in the electronic message. Next, the system determines a financial transaction category associated with the destination address (step 404). The system then associates the financial transaction category along with the parameters for the financial transaction with the user account (step 406). In one embodiment of the present invention, the destination address can be located in a header field (e.g., the "To" field, the "CC" field, the "Subject" field, or any other portion of the message now known or later developed), specified fields of network protocols (e.g., the version, header length, type of service, total length, identification, flags, fragment offset, time to live, protocol, header checksum, source address, destination address, options, and data fields the Internet Protocol), and the body of the message (e.g., either encoded or unencoded).

In one embodiment of the present invention, the system associates the destination address along with the parameters for the financial account with the user account. The system then associates a financial transaction category with the destination address in subsequent processing for the user account. For example, the destination address is associated with a financial transaction category when diagnostics are performed on the user account.

In one embodiment of the present invention, the financial transaction category can include: donations; expenses; income; gifts; taxes; and any other financial transaction category. For example, the destination address "donations@somedomain.com" can be associated with donations whereas the destination address "expenses@somedomain.com" can be associated with business expenses.

Parsing Electronic Messages

One embodiment of the present invention parses electronic messages to extract parameters for financial transactions. In this embodiment, the parameters can include information about: a party to the financial transaction; an amount of the financial transaction; a description of the financial transaction, and any other information deemed relevant.

Figure 5:
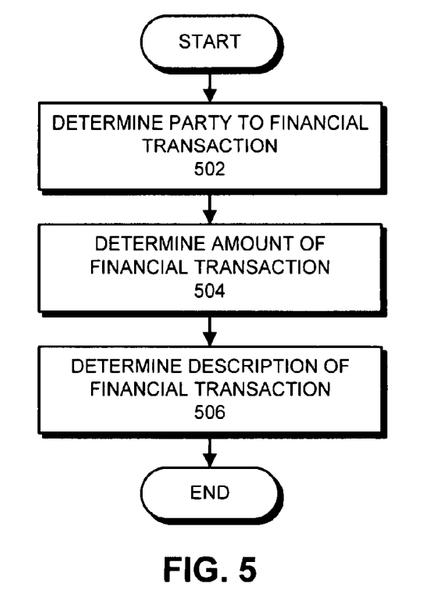
FIG. 5 presents a flow chart illustrating the process of parsing an electronic message to extract one or more parameters for a financial transaction in accordance with an embodiment of the present invention.

FIG. 5 presents a flow chart illustrating the process of parsing an electronic message to extract parameters for a financial transaction in accordance with an embodiment of the present invention. The process begins when the system determines the party to the financial transaction (step 502). Next, the system determines the amount of the financial transaction (step 504). The system then determines the description of the financial transaction (step 506). For example, if the format of the electronic message is:

<who> <how much> <description> the transaction amount (e.g., a string of numbers) can be used to indicate the end of the <who> field and the start of the <description field> when parsing the electronic message.

In one embodiment of the present invention, if there are multiple parties to the financial transaction, the system generates multiple records for the financial transaction. For example, if there are two parties in the who field, two records are generated, one for each party in the who field. Another example of when multiple records are generated for a single financial transaction is described in the "Donation Clearing House" example below.

Diagnostics

Figure 6:
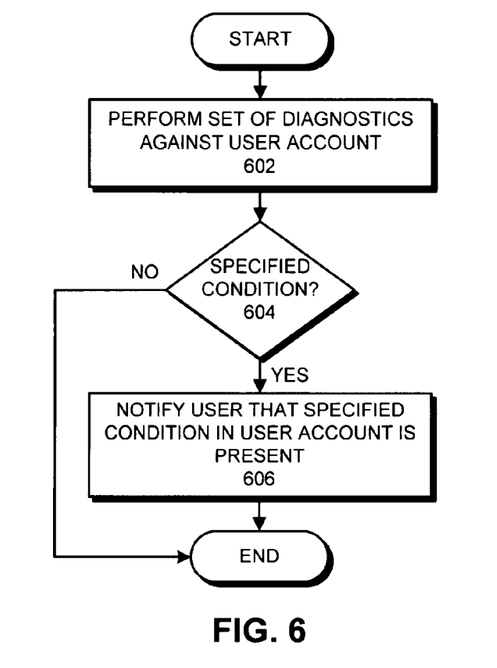
FIG. 6 presents a flow chart illustrating the process of performing a set of diagnostics on a user account in accordance with an embodiment of the present invention.

One embodiment of the present invention performs a set of diagnostics on a user account. Referring to FIG. 6, the process begins when the system performs a set of diagnostics against the user account to determine whether a specified condition in the user account is present (step 602). In one embodiment of the present invention, the specified condition can involve exceeding a specified limit for a given financial category. For example, the specified limit can be a tax-deduction limit for charitable contributions. In one embodiment of the present invention, the specified condition can involve not meeting a minimum limit. For example, for miscellaneous expenses to be deductible, the total miscellaneous expenses must exceed 2% of the adjusted gross income. If so (step 604, yes), the system notifies the user that the specified condition was detected (step 606). In one embodiment of the present invention, notifying the user involves sending a notification by one or more of: an email message; a short message service (SMS) message; an instant message; an automated phone message; a message contained in a letter; and by using any other appropriate form of communication.

In one embodiment of the present invention, the set of diagnostics can include one or more rulesets wherein one or more financial transaction categories are associated with a ruleset. In one embodiment, one or more financial transaction categories are not associated with a ruleset.

Generating Reports

One embodiment of the present invention generates reports of financial transactions associated with the user account. For example, a report on tax deductible contributions can be generated. These reports can then be imported into financial applications such as Quicken and QuickBooks.

One embodiment of the present invention delegates access to the user account to another entity. For example, a user can delegate access to the user account to a tax preparer. The tax preparer can then access financial transaction information associated with the user account. In this embodiment, the other entity can generate reports of financial transactions associated with the user account.

Exemplary Implementation: Donation Clearing House

One embodiment of the present invention provides a centralized donation clearing house service which accepts electronic messages which include parameters for the donation within the electronic message. The donation clearing house service parses the electronic messages to determine the source email address and the parameters for the donation. The donation clearing house service then posts the donation information from the message to a donation account associated with the source address.

In one embodiment of the present invention, any email-enabled electronic device (e.g., a cell phone, a gaming console, a computer, etc.) can be used to compose and to send an email with parameters for a donation. In one embodiment, the email-enabled electronic device is a cell phone. These parameters can include, but are not limited to: the donee, the amount, and an optional description. In one embodiment of the present invention, the electronic message is sent to a specific email address which is routed to the centralized donation clearing house service.

In one embodiment of the present invention, once the centralized-donation-clearing-house service receives an electronic message, it parses the electronic message to determine a source address and the parameters for the donation transaction. The source address is used to identify a donation account. In one embodiment of the present invention, the donation account is identified by parsing the "From" field of the electronic message. In one embodiment of the present invention, a donation account can be associated with one or more registered source addresses which can be used to uniquely identify the donation account.

In one embodiment of the present invention, the body of the electronic message can be formatted as follows:

<who> <how much> <description>

Note that other formats can be used. Once the parameters are extracted from the electronic message, a new donation transaction is created based on the parameters. The donation transaction is then posted to the user's donation account.

In one embodiment of the present invention, after the transaction is posted to the user's donation account, a set of diagnostics is run against the user's aggregated set of donations looking for specific conditions. For example, the specific condition can include exceeding an IRS limit for cash donations. If the specific condition is satisfied, the centralized-donation-clearing-house service sends an email regarding the condition to the user. For example, if an individual is approaching or has exceeded a limit for cash donations, the service notifies the donation account owner of the situation.

In one embodiment of the present invention, users can create a donation account on a website for the service. Each donation account can be associated with one or more source addresses. For example, the source address can be an email address. Additional source addresses can be added at any time after the account is initially created.

In one embodiment of the present invention, a user with a donation account can login to the system and generate a report to see their current donation transactions and to update information as necessary. At the end of the year, the user can log onto the donation clearing house service and generate a report with all the donation information for the year. This report can then be sent to a tax preparer and imported directly into their tax return. This report can also be imported into a financial application such as Quicken or QuickBooks.

In another embodiment of the present invention, the user can delegate access to the user's donation account to another entity. For example, the user can delegate access to the user's donation account to a tax preparer.

In one embodiment of the present invention, the centralized donation clearing house service can accept electronic messages from registered charitable organizations. These registered charitable organizations can generate the electronic message with the appropriate format and send it to the service. In this case, the "From" field identifies the registered charitable organization and the "CC" field identifies for the user's donation account. In other embodiments, the source address can be located in one or more of: any header field (e.g., header fields listed at the Internet Assigned Number Authority), specified fields of network protocols (e.g., the Internet Protocol), and the body of the message (e.g., either encoded or unencoded). This process allows both the individual and the donation-clearing-house-service to receive a record of the donation transaction for security purposes.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for tracking financial transactions for a user, wherein the computer includes a processor, the method comprising:
   receiving an electronic message addressed to a destination address which indicates a financial transaction category, wherein the electronic message includes one or more parameters for a financial transaction;
   determining the financial transaction category based on the destination address of the electronic message, wherein the financial transaction category indicates a purpose of the financial transaction;
   parsing a body of the electronic message to extract the parameters for the financial transaction;
   generating one or more financial records for the financial transaction based on the extracted parameters;
   determining whether a source address of the electronic message is associated with a user account; and
   if the source address of the electronic message is associated with the user account, associating the financial records and the financial transaction category with the user account.

2. The method of claim 1, wherein the financial transaction category includes one or more selected from the group consisting of:
   donations;
   expenses;
   income;
   gifts;
   taxes; and
   any other financial transaction category.

3. The method of claim 1, further comprising:
   associating the destination address along with the financial records with the user account; and
   associating a financial transaction category with the destination address.

4. The method of claim 1, wherein if the source address is not associated with a user account, the method further comprises:
   creating an unregistered user account that is associated with the source address; and
   associating the financial records for the financial transaction with the unregistered user account.

5. The method of claim 4, wherein after creating the unregistered user account, the method further comprises sending the user an electronic message which includes a uniform resource locator (URL) and login information which can be used to access the unregistered account.

6. The method of claim 4, the method further comprises allowing a user to register the unregistered user account.

7. The method of claim 1, wherein the electronic message is sent by the user.

8. The method of claim 7, wherein the source address is located in a "From" field of the electronic message.

9. The method of claim 1, wherein the electronic message is sent by another entity on behalf of the user.

10. The method of claim 9, wherein the other entity can include a party to the financial transaction.

11. The method of claim 9, wherein the source address is located in a "CC" field of the electronic message.

12. The method of claim 1, wherein the source address is located in one or more of:
   headers of the electronic message;
   specified fields of network protocols; and
   the body of the message.

13. The method of claim 1, wherein the source address includes one or more selected from the group consisting of:
   an email address;
   an Internet Protocol (IP) address;
   a user name;
   a Tax Identification Number (TIN);
   a Social Security Number (SSN);
   an International Mobile Equipment Identity (IMEI) number;
   a Mobile Equipment Identifier (MEID);
   an Electronic Serial Number (ESN);
   a Pseudo ESN (pESN);
   a Media Access Control (MAC) address;
   a domain name; and
   a unique identifier.

14. The method of claim 1, wherein the one or more parameters include one or more selected from the group consisting of:
   a party to the financial transaction;
   an amount of the financial transaction; and
   a description of the financial transaction.

15. The method of claim 14, wherein parsing the electronic message to extract the one or more parameters for the financial transaction involves determining:
   a party to the financial transaction;
   the amount of the financial transaction; and
   the description of the financial transaction.

16. The method of claim 1, further comprising:
   performing a set of diagnostics against the user account to determine whether a specified condition in the user account is present; and
   if so, notifying the user that the specified condition is present.

17. The method of claim 16, wherein the set of diagnostics can use one or more rulesets.

18. The method of claim 17, wherein one or more financial transaction categories are associated with corresponding rulesets.

19. The method of claim 16, wherein the specified condition can involve exceeding a specified limit for a given financial category.

20. The method of claim 16, wherein the specified condition can involve not meeting a specified minimum threshold for a given financial category.

21. The method of claim 16, wherein notifying the user involves sending a notification by one or more of:
- an email message;
- a short message service (SMS) message;
- an instant message;
- an automated phone message; and
- a message contained in a letter.

22. The method of claim 1, where prior to receiving the electronic message, the method further comprises creating the user account.

23. The method of claim 22, further comprising associating one or more source addresses for one or more users authorized to access the user account.

24. The method of claim 1, further comprising generating a report of financial transactions associated with the user account.

25. The method of claim 24, further comprising importing the report into a financial application.

26. The method of claim 1, further comprising delegating access to the user account to another entity.

27. A non-transitory computer-readable storage medium storing instructions that when executed by a computer cause the computer to perform a method for tracking financial transactions for a user, wherein the method comprises:
- receiving an electronic message addressed to a destination address which indicates a financial transaction category, wherein the electronic message includes one or more parameters for a financial transaction;
- determining the financial transaction category based on the destination address of the electronic message, wherein the financial transaction category indicates a purpose of the financial transaction;
- parsing a body of the electronic message to extract the parameters for the financial transaction;
- generating one or more financial records for the financial transaction based on the extracted parameters;
- determining whether a source address of the electronic message is associated with a user account; and
- if the source address of the electronic message is associated with the user account, associating the financial records and the financial transaction category with the user account.

28. The computer-readable storage medium of claim 27, wherein the financial transaction category includes one or more selected from the group consisting of:
- donations;
- expenses;
- income;
- gifts;
- taxes; and
- any other financial transaction category.

29. The computer-readable storage medium of claim 27, further comprising:
- associating the destination address along with the financial records with the user account; and
- associating a financial transaction category with the destination address.

30. The computer-readable storage medium of claim 27, wherein if the source address is not associated with a user account, the method further comprises:
- creating an unregistered user account that is associated with the source address; and
- associating the financial records for the financial transaction with the unregistered user account.

31. The computer-readable storage medium of claim 30, wherein after creating the unregistered user account, the method further comprises sending the user an electronic message which includes a uniform resource locator (URL) and login information which can be used to access the unregistered account.

32. The computer-readable storage medium of claim 30, wherein the method further comprises allowing a user to register the unregistered user account.

33. The computer-readable storage medium of claim 27, wherein the electronic message is sent by the user.

34. The computer-readable storage medium of claim 33, wherein the source address is located in a "From" field of the electronic message.

35. The computer-readable storage medium of claim 27, wherein the electronic message is sent by another entity on behalf of the user.

36. The computer-readable storage medium of claim 35, wherein the other entity can include a party to the financial transaction.

37. The computer-readable storage medium of claim 35, wherein the source address is located in a "CC" field of the electronic message.

38. The computer-readable storage medium of claim 27, wherein the source address is located in one or more of:
- headers of the electronic message;
- specified fields of network protocols; and
- the body of the message.

39. The computer-readable storage medium of claim 27, wherein the source address includes one or more selected from the group consisting of:
- an email address;
- an Internet Protocol (IP) address;
- a user name;
- a Tax Identification Number (TIN);
- a Social Security Number (SSN);
- an International Mobile Equipment Identity (IMEI) number;
- a Mobile Equipment Identifier (MEID);
- an Electronic Serial Number (ESN);
- a Pseudo ESN (pESN);
- a Media Access Control (MAC) address;
- a domain name; and
- a other unique identifier.

40. The computer-readable storage medium of claim 27, wherein the financial records include one or more of:
- a party to the financial transaction;
- an amount of the financial transaction; and
- a description of the financial transaction.

41. The computer-readable storage medium of claim 40, wherein parsing the electronic message to extract the financial records for the financial transaction involves determining:
- a party to the financial transaction;
- the amount of the financial transaction; and
- the description of the financial transaction.

42. The computer-readable storage medium of claim 27, wherein the method further comprises:
- performing a set of diagnostics against the user account to determine whether a specified condition in the user account is present; and
- if so, notifying the user that the specified condition is present.

43. The computer-readable storage medium of claim 42, wherein the set of diagnostics can use one or more rulesets.

44. The computer-readable storage medium of claim 43, wherein one or more financial transaction categories are associated with corresponding rulesets.

45. The computer-readable storage medium of claim 42, wherein the specified condition can involve exceeding a specified limit for a given financial category.

46. The computer-readable storage medium of claim 42, wherein the specified condition can involve not meeting a specified minimum threshold for a given financial category.

47. The computer-readable storage medium of claim 42, wherein notifying the user involves sending a notification by one or more of:
   an email message;
   a short message service (SMS) message;
   an instant message;
   an automated phone message; and
   a message contained in a letter.

48. The computer-readable storage medium of claim 27, where prior to receiving the electronic message, the method further comprises creating the user account.

49. The computer-readable storage medium of claim 48, wherein the method further comprises associating one or more source addresses for one or more users authorized to access the user account.

50. The computer-readable storage medium of claim 27, wherein the method further comprises generating a report of financial transactions associated with the user account.

51. The computer-readable storage medium of claim 50, wherein the method further comprises importing the report into a financial application.

52. The computer-readable storage medium of claim 27, wherein the method further comprises delegating access to the user account to another entity.

53. An apparatus that tracks financial transactions for a user, comprising:
   a processor;
   a memory;
   a receiving mechanism configured to receive an electronic message addressed to a destination address which indicates a financial transaction category, wherein the electronic message includes one or more parameters for a financial transaction;
   a category-determining mechanism configured to determine the financial transaction category based on the destination address of the electronic message, wherein the financial transaction category indicates a purpose of the financial transaction;
   a parsing mechanism configured to parse a body of the electronic message to extract the parameters for the financial transaction;
   a generating mechanism configured to generate one or more financial records for the financial transaction based on the extracted parameters;
   an account-lookup mechanism configured to determine whether a source address of the electronic message is associated with a user account; and
   an association mechanism, wherein if the source address is associated with the user account, the association mechanism is configured to associate the financial records and the financial transaction category with the user account.

* * * * *